C. SCHWARTZ.
FABRIC MEASURING AND CUTTING MACHINE.
APPLICATION FILED NOV. 12, 1912.

1,090,796.

Patented Mar. 17, 1914.
6 SHEETS—SHEET 1.

Witnesses
W. C. Stein
M. G. Lindsay.

Inventor
Carl Schwartz
by Alfred A. Ricks atty

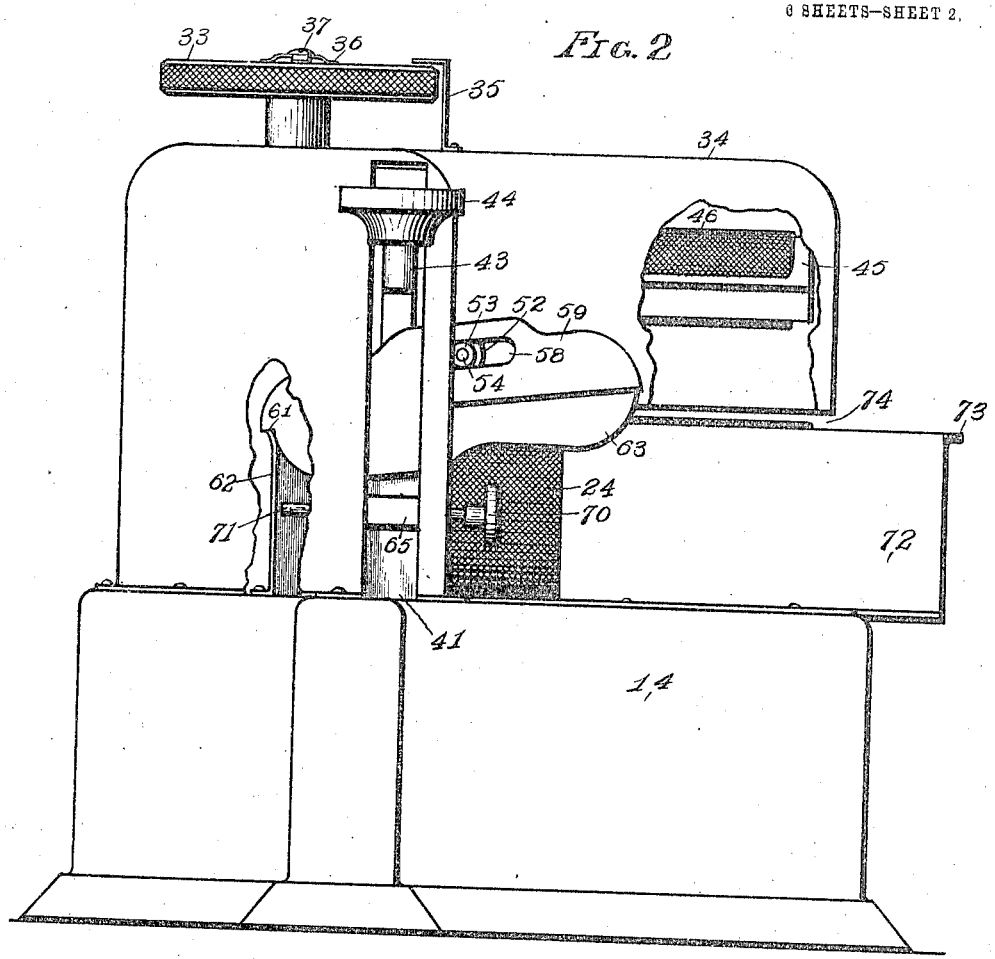
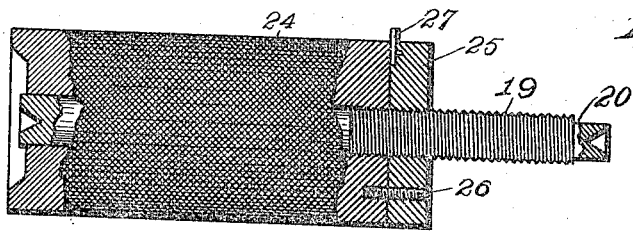

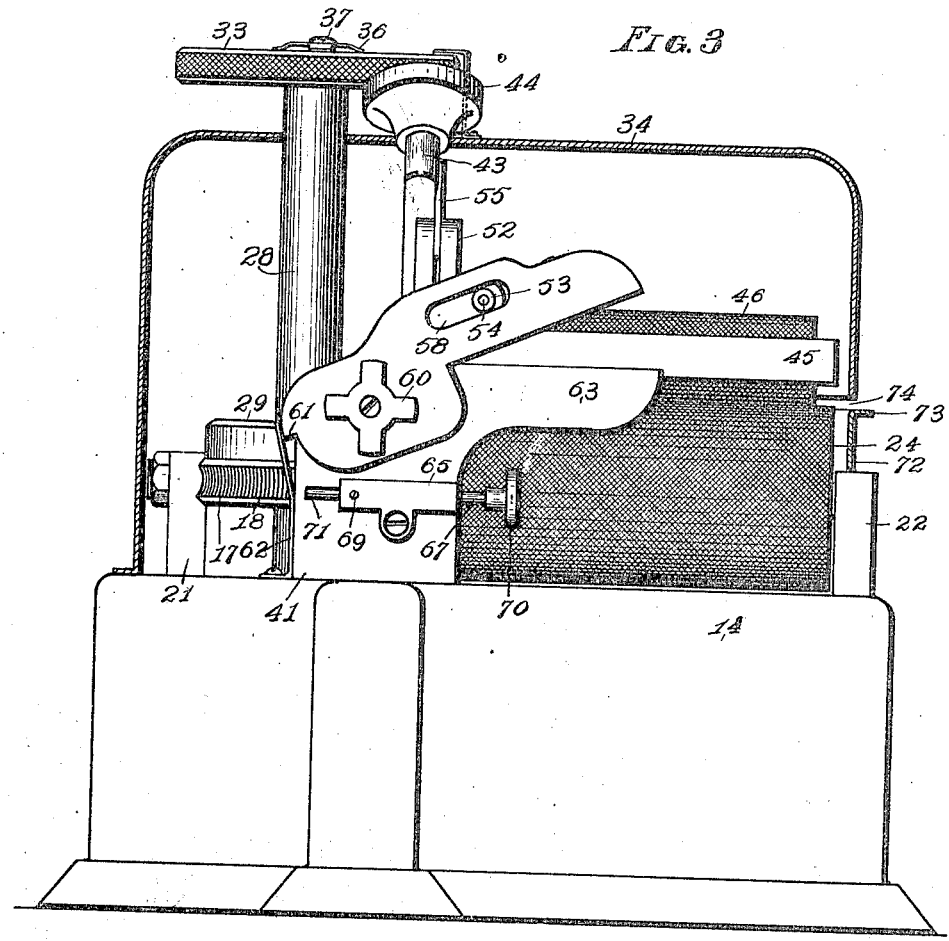

C. SCHWARTZ.
FABRIC MEASURING AND CUTTING MACHINE.
APPLICATION FILED NOV. 12, 1912.

1,090,796.

Patented Mar. 17, 1914.
6 SHEETS—SHEET 4.

Witnesses
W. C. Stein
M. G. Lindsay.

Inventor
Carl Schwartz
by Alfred W. Ficks atty.

C. SCHWARTZ.
FABRIC MEASURING AND CUTTING MACHINE.
APPLICATION FILED NOV. 12, 1912.

1,090,796.

Patented Mar. 17, 1914.
6 SHEETS—SHEET 5.

Witnesses
W. C. Stein
M. G. Lindsay

Inventor
Carl Schwartz
by Alfred A. Eick's Atty.

C. SCHWARTZ.
FABRIC MEASURING AND CUTTING MACHINE.
APPLICATION FILED NOV. 12, 1912.
1,090,796.
Patented Mar. 17, 1914.
6 SHEETS—SHEET 6.
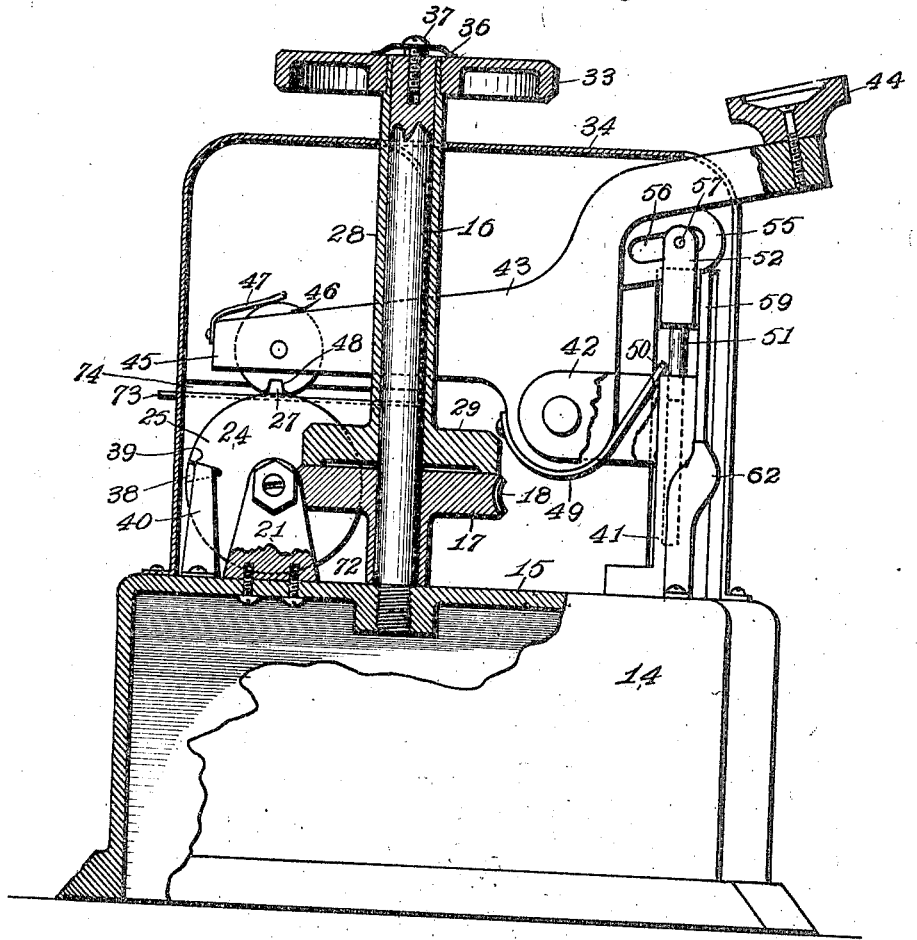
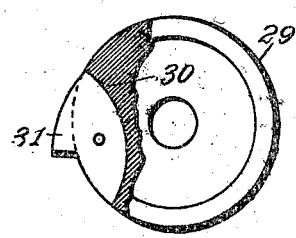
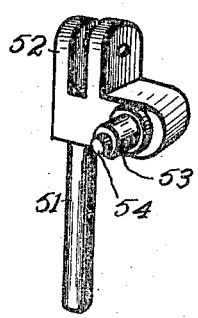
Witnesses
W. C. Stein
M. G. Lindsay
Inventor
Carl Schwartz
by Alfred A. Ticke Atty

UNITED STATES PATENT OFFICE.

CARL SCHWARTZ, OF ST. LOUIS, MISSOURI.

FABRIC MEASURING AND CUTTING MACHINE.

1,090,796.

Specification of Letters Patent. Patented Mar. 17, 1914.

Application filed November 12, 1912. Serial No. 731,016.

*To all whom it may concern:*

Be it known that I, CARL SCHWARTZ, a citizen of the United States, and resident of St. Louis, Missouri, have invented certain new and useful Improvements in Fabric Measuring and Cutting Machines, of which the following is a specification.

This invention relates to improvements in a fabric measuring and cutting machine of the type described and illustrated in my companion application, Ser. No. 707,127, filed July 1, 1912, and has for its general object improvements in that part of the mechanism employed for measuring the fabric and cutting the same at the termination of the measured portion.

Stated more in detail the invention aims to provide a machine of a simple and compact construction by which fabrics of various kinds may be measured off in required lengths as indicated by setting means operating in conjunction with the movement of the fabric, combined with means for marking the fabric at the termination of the measured portion by slitting the same so that said fabric can be ripped or cut by shears on the line of the slit, and the said machine embodying stop mechanism for preventing further movement of the machine when the length of material which the indicator has been set to measure has been run through the machine.

To this end the invention comprises essentially a fabric measuring and cutting machine embodying a pair of friction rollers between which the fabric is adapted to be drawn to rotate the rollers, shears for marking the fabric by means of slitting the same at the required length, and an indicator for indicating the length of the fabric to be measured, the said elements being combined and operating in the manner hereinafter described.

Figure 1:
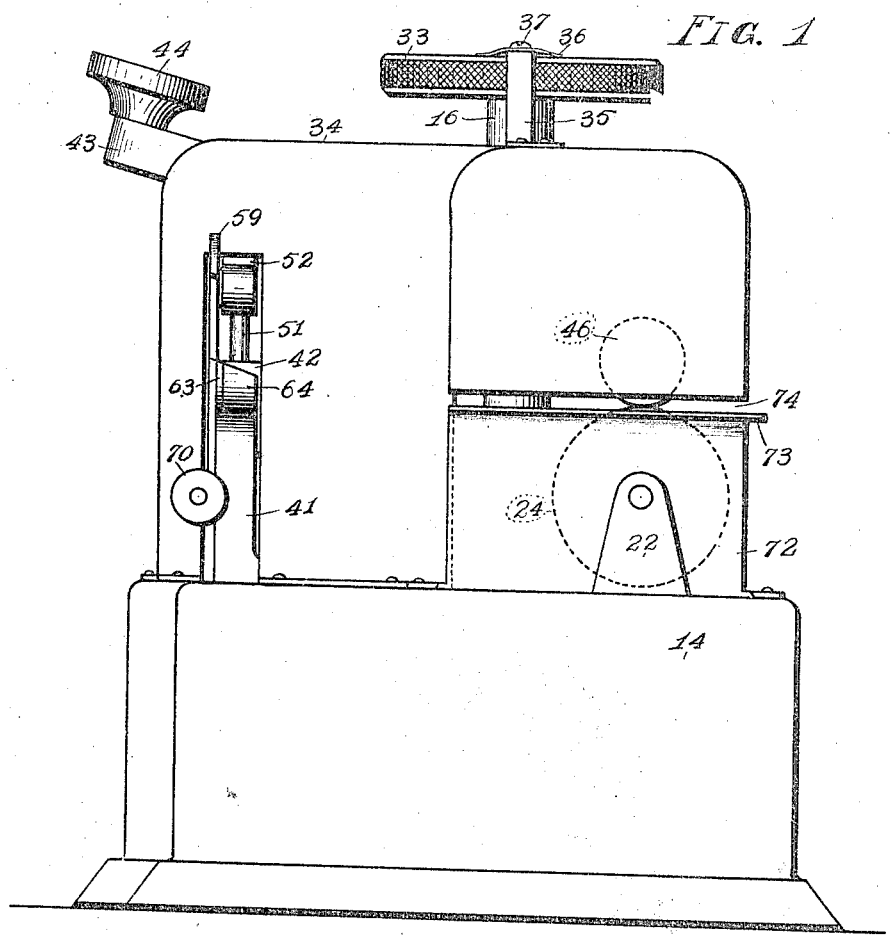
Figure 10:
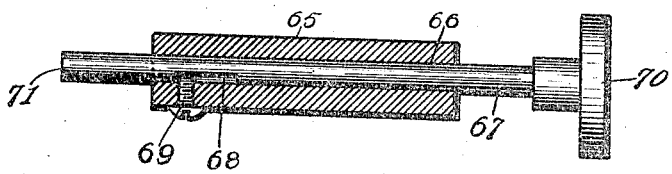
Figure 4:
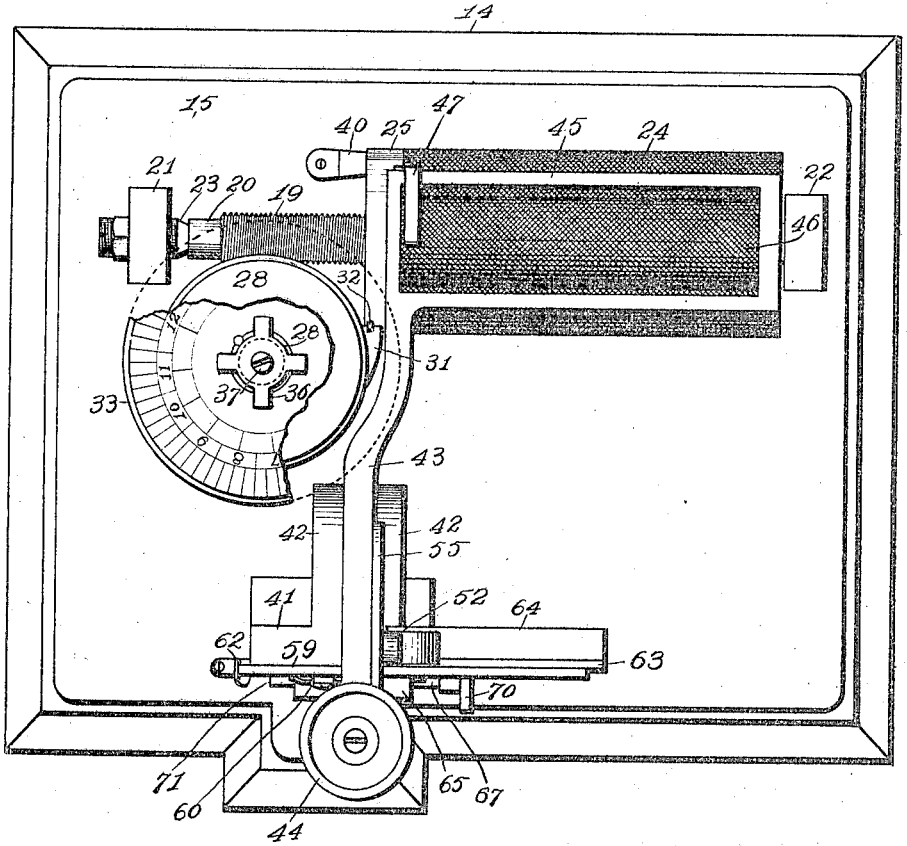
Figure 7:
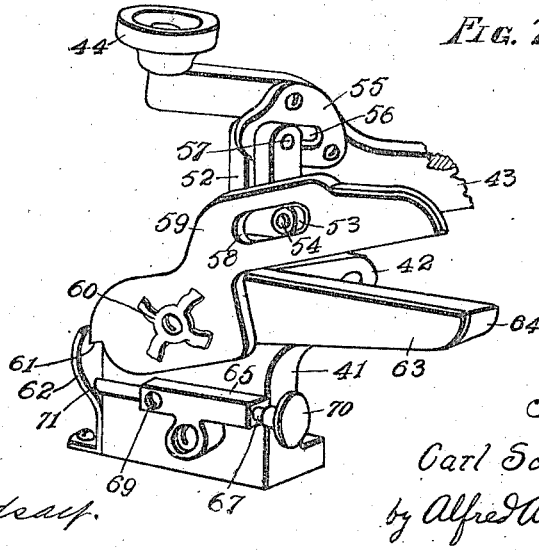
Figure 5:
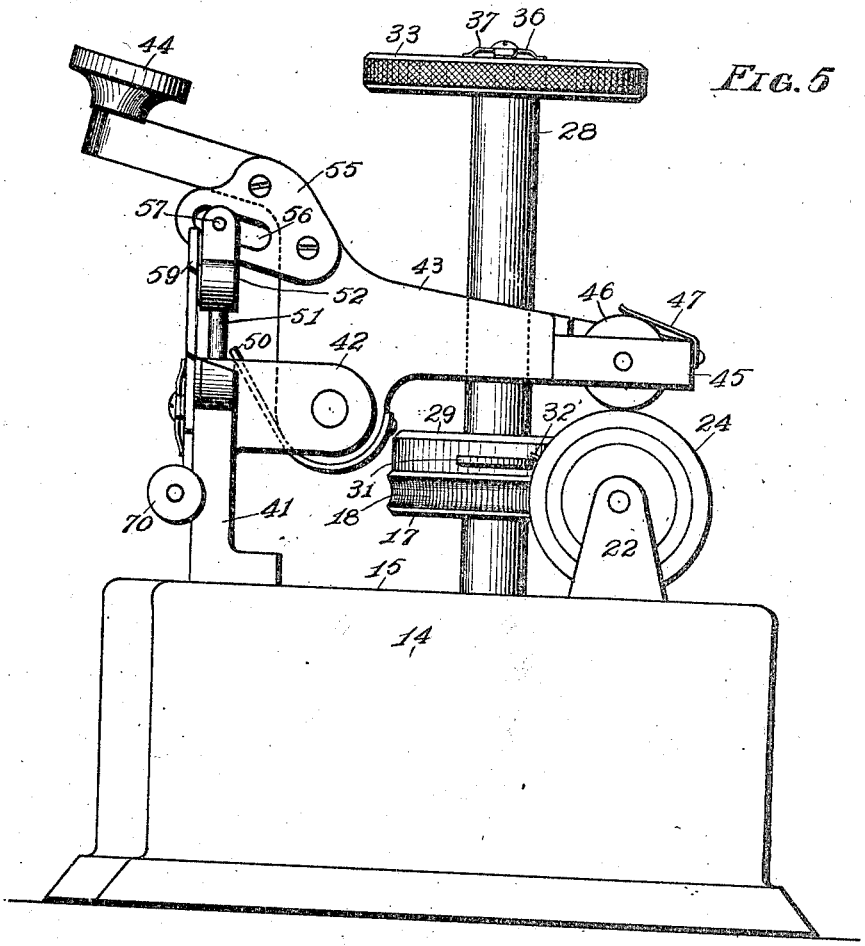
Figure 13:
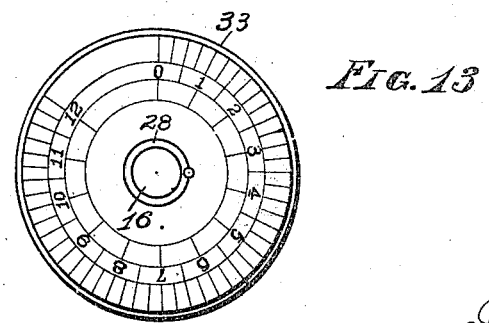

In the accompanying drawings Figure 1 is a front view of my complete invention; Fig. 2 is an end view of the same with parts of the housing broken away showing a portion of the internal mechanism; Fig. 3 is an end view with the housing in section and the shears or slitting mechanism in open position; Fig. 4 is a top plan view with the housing removed; Fig. 5 is a front view with the housing removed showing the arrangement of the mechanism; Fig. 6 is a sectional view showing the frictional indicator mechanism and the various working parts; Fig. 7 is a detail perspective view of the shears or slitting mechanism together with the lever for operating the same, a part of said lever being broken away; Fig. 8 is a detail perspective view of the lower portion of the friction mechanism showing the stop mechanism which operates in conjunction with one of the rollers for limiting the movement of the fabric; Fig. 9 is a detail view of the bottom measuring roller, a part being broken away and in section showing its construction; Fig. 10 is a detail sectional view of the mechanism by which the shear or slitting device is returned to its open position; Fig. 11 is a detail bottom plan view of the friction disk with a part broken away and in section showing the top lug by which the movement of the bottom roller is limited; Fig. 12 is a detail perspective view of the plunger which is used in connection with the shear operating device; and Fig. 13 is a top plan view of the indicator or measuring dial.

In the construction of my invention I provide a suitable base 14 which is raised sufficiently high above the table line to permit convenient handling of the fabric and on the top portion 15 of the base 14 is mounted a post 16 loosely mounted on which is located a worm gear 17, and so arranged that the teeth 18 on its periphery mesh with the worm 19 formed on a shaft 20 which is supported between uprights 21 and 22; the ends of the said shaft are held in position by adjustable pivot bearings 23. On the shaft 20 is located a roller 24 and on the end of said roller is attached a collar 25 which is held to the roller by the screw 26 and between the collar and the end of the roller is held a projecting lug 27.

On the post 16 is located a sleeve 28 which is loosely mounted, its bottom being provided with a friction disk 29 having a portion of itself recessed as indicated by the numeral 30 Fig. 11 and in which recess is seated and supported a projecting lug or tooth 31 which is arranged to come in contact with a pin 32 Fig. 8 projecting from the collar 25 of the roller 24, coincident with the return of the measuring disk, hereinafter referred to, to the zero position. On the top of the sleeve 28 is mounted an indicator or measuring disk 33, the periphery being knurled so that said disk can be operated by the hand and turned to the proper indication, the upper surface of said disk being graduated as shown, the said graduations running from zero to twelve or more as found desirable, and being sub-divided to indicate fractions of a yard. On the top 34 of the housing is mounted a pointer 35, the upper edge of which is bent over the top of the disk and with the same is adapted to register any one of the graduations on the disk to indicate the number of yards to be measured by the machine.

The disk together with the sleeve and friction disk 29 is held in frictional relation with the worm gear 17, by means of the spring 36 secured on the post 16 by the screw 37; this spring frictionally engages the measuring disk 33 and by its pressure thereon maintains the disk 29 in frictional contact with the worm gear, so that the disk 33 will rotate simultaneously with the worm gear while the fabric is being measured yet will permit the measuring disk and sleeve to operate independently of the worm gear 17 when shifting said disk to bring the proper graduation in registry with the pointer 35 to indicate the number of yards of fabric to be measured.

The rear of the roller 24 is provided with an inclined recess 38 Fig. 6 forming a shoulder 39 with which the free end of the spring 40 engages so as to prevent the roller 24 from rotating in a reverse movement, the said spring being attached to the top 15 of the base.

On the top 15 of the base 14 is mounted a support 41, Figs. 4, 5 and 7 which is provided with a projecting perforated lug or ear 42 in which is pivotally mounted a lever 43, the upper end of which is provided with an operating button 44. The opposite end of the lever has extending at right angles thereto a frame 45 in which is rotatably mounted a roller 46, this roller being approximately the same length as the roller 24, between which and the roller 46 the fabric to be measured is placed, and being adapted to be brought into contact with or separated from the roller by means of said lever. In order to prevent the roller 46 from rotating while the lever 43 is being raised and lowered, a spring 47 is attached to the frame 45 and bears upon the upper surface of said roller 46. The edge of this roller is provided with a recess 48 Fig. 6 corresponding to the lug 27 on the roller 24 and arranged to receive the same to hold said rollers in locked position when the required length of fabric has been drawn between the rollers and the pin 32 engages the lug 31. The intermeshing of lug 27 with recess 48 does not prevent the free rotation of roller 24 at other times than when roller 24 is locked by the engagement of 32 with 31.

On the lever 43 is attached a spring 49 Fig. 6, the said spring extending upwardly between the ears 42 and its free end 50 bearing against the upper edge of the support 41, the purpose of said spring being to normally hold the lever in the position shown in Fig. 6, with the roller 46 in frictional contact with the roller 24.

In the support 41 is provided an elongated bore which receives and permits free movement of the plunger 51, the upper end of which is provided with a bifurcated head 52 on which is mounted a roller 53 on a trunnion 54. The ears forming the bifurcated portion of the head straddle a blade 55 which is firmly attached to the lever 43, the said blade being provided with an elongated slot 56 in which a pin 57 carried by the ears of the head 52 operates.

The roller 53 carried by the head 52 projects through and operates in an elongated slot 58 formed in the movable blade 59 of the shears which blade is pivotally connected to the support 41 and held in position by pressure and frictional contact of the spring plate 60, which, however, permits the said movable blade to readily turn on its pivot to perform its cutting function. On the movable blade is provided a shoulder 61 with which engages the free end of the spring 62 and by said spring, the movable blade is held in closed position against the horizontal stationary blade 63, when the roller 46 is in an elevated position as shown in Fig. 2.

The horizontal or stationary blade 63 is firmly attached to the projecting arm or jaw 64 which forms a part of the support 41; the arrangement of this structure is clearly shown in Fig. 7.

On the support 41 and beneath the movable blade is mounted a bolt casing 65, the same being provided with an elongated bore 66 Fig. 10 in which is supported a bolt 67. the said bolt having an elongated recess 68 in which projects the screw 69 for limiting the longitudinal movement of the bolt. On moving said bolt inward by pressing on its head 70, the opposite free end 71 is designed to come in contact with the leaf spring 62, releasing its upper free end from the shoulder or tooth 61 of the movable cutter, and when so released the tension of the spring 49 is exerted to throw the inner end of the lever 43 downward and bring the roller 46 in contact with the roller 24, and simultaneously open the jaws of the cutter by elevating the movable blade.

The housing which incases the mechanism and which is mounted on the top of the base 14 is provided with a movable section 72 Fig. 2 which incases the roller 24, and the upper outer edge of which is provided with a flange 73 which acts as a guide to the fabric in placing the same between the rollers, and as a support therefor while the fabric is being drawn between the rollers. The flange 73 will tend to prevent the fabric from folding or creasing while the same is being advanced through the slot 74 formed between the top of the movable section 72 and the bottom of the rigid housing, and while the cloth is being drawn through the machine.

The operation of my invention is as follows: When it is desired to measure off a strip of fabric the measuring disk or indicator is first manipulated by the hand to bring the graduation designating the number of yards to be measured in registry with the pointer; the handle of the lever 43 is pressed downwardly to the position shown in Fig. 2 which operation closes the shears and elevates the roller 46; the cloth is then inserted through the slot 74 and over the bottom or large roller 24, and the end of the fabric is brought in contact with the inner surface of the closed cutter, which acts as the starting point from which to measure the goods. When this has been done the bolt 67 is pressed inwardly the free end 71 engaging the leaf spring 62 and releasing it from the shoulder 61 of the movable cutter blade; this action permits the spring 49 to exert its power to force the lever 43 downwardly to the position shown in Fig. 6, thereby bringing the roller 46 to bear upon the fabric and binding it between said roller and the roller 24. The surface of said rollers being knurled or otherwise roughened, the same will be caused to rotate by pulling upon the fabric by frictional contact. By the same downward movement of the lever 43 the movable cutter blade will simultaneously operate opening the jaws of the cutter, and when the fabric has been drawn between the rollers and the indicator returned to its normal position or zero, the lug 31 of the friction disk will engage the pin 32 on the roller 24, and prevent further forward movement of said roller; at this same position the lug 27 will enter the recess 48 of the roller 46 preventing it from rotating farther, and the spring 40 engaging the shoulder 39 will prevent reverse movement of the roller 24.

One revolution of the roller 24 is equivalent to the least amount the machine is adapted to measure, say, one-eighth of a yard. In measuring any greater amount, up to twelve yards, in the present case, the roller 24 will be continuously revolved until it is stopped by the tooth 31 engaging the pin 32 of said roller, which engagement, as before stated, is coincident with the return of the measuring disk 33 to the zero position. It will be seen, therefore, that the lug 27, by its engagement in the recess 48, serves to lock the roller 46 against rotation only when the tooth 31 and pin 32 are in engagement.

When the rollers become locked it is an indication that the determined number of yards or length to be measured has been completed, and at this juncture the operator by manipulating the handle of the lever 43, operates the shears to slit the fabric, which is a mark or indication of the length measured and the operator severs the cloth at the slit by means of the ordinary shears, or by ripping it.

The movement of the roller 24 imparts motion to the indicator or measuring disk through the medium of the worm 19 and the worm gear 18, the latter rotating said indicator by frictional contact with the disk 29.

I claim:

1. A fabric measuring and cutting machine comprising a pair of friction rollers, a movable carrier for one of said rollers for bringing it into contact with and separating it from the other roller, an indicator operated by the movement of said other roller, a shear for slitting the fabric at its correct measured length and means operated by the movement of said carrier as it separates the one roller from the other, to actuate said shear.

2. A fabric measuring and cutting machine comprising a pair of friction rollers, a movable carrier for one of said rollers for bringing it into contact with and separating it from the other roller, an indicator operated by the movement of said other roller, a shear for slitting the fabric at its correct measured length, means operated by the movement of the said carrier as it separates the one roller from the other to actuate said gear, and releasable means for holding one of said rollers out of contact with the other.

3. A fabric measuring and cutting machine comprising a pair of friction rollers adapted to be rotated by frictional contact with fabric drawn between them, a movable carrier for one of said rollers for bringing it into contact with and separating it from the other roller, an indicator operated by the movement of said other roller, a shear for slitting the fabric at its correct measured length, means operated by the movement of the said carrier as it separates the one roller from the other to actuate said shear, releasable means for holding one of said rollers out of contact with the other, and means for automatically actuating the carrier to cause it to bring its roller into contact with the other roller when the holding means has been released.

4. A fabric measuring and cutting machine comprising a pair of friction rollers adapted to be rotated by frictional contact with fabric drawn between them, a movable carrier for one of said rollers for bringing it into contact with and separating it from the other roller, an indicator operated by the movement of said other roller, interlocking means carried, respectively, by the rollers and a brake mounted on said carrier for preventing the free rotation of its roller, whereby to prevent the relative positions of said interlocking means from being changed.

5. A fabric measuring and cutting machine comprising a pair of friction rollers adapted to be rotated by frictional contact with fabric drawn between them, a moveable carrier for one of said rollers for bringing it into contact with and separating it from the other roller, an indicator operated by the movement of said other roller, a brake for the roller in the carrier, interlocking means carried by the respective rollers and adapted to be brought into engagement at the completion of a rotation of the said other roller, and means for locking said other roller against further movement at such period.

6. In a machine of the character described, a pair of friction rollers adapted to be rotated by frictional contact with fabric drawn between them, a carrier for one of said rollers for bringing it into contact with and separating it from the other roller, a measuring disk adapted to be turned to indicate the number of yards to be measured and to be returned to zero by the rotation of said rollers, and means for locking said rollers against further rotation coincident with the return of said disk to the zero position.

7. A machine of the class described comprising a pair of friction rollers between which fabric is adapted to be drawn to rotate the same by frictional contact therewith, a measuring disk frictionally mounted and operated by and in unison with the movement of said rollers, a shear for slitting the fabric at the termination of the measurement, and lever mechanism for operating the shear and for simultaneously moving one of said rollers into contact with or separating it from the other roller.

8. A device of the class described comprising a base, a worm shaft mounted thereon, a roller mounted on said shaft, a post supported on the base, a worm gear loosely mounted on said post and having engagement with the worm of said shaft, a measuring disk loosely mounted on said post and having frictional relation with said worm gear to be turned thereby, but movable independent of the said gear, means for locking the roller against rotation when the measuring disk has been turned thereby to zero, a pivoted lever, a roller mounted thereon and adapted to be carried thereby into and out of contact with the roller on the base, and cutting mechanism adapted to be operated by said lever in its movements aforesaid.

9. A fabric measuring and cutting machine comprising a pair of friction rollers between which fabric is adapted to be drawn to rotate the same by frictional contact therewith, a measuring disk co-acting with one of said rollers and adapted to be operated by and in synchronism therewith, a shear, lever mechanism for operating the shear to slit the fabric and having the other roller mounted therein and adapted to simultaneously raise the same out of contact with the fabric as the shear is operated to slit the same.

10. A device of the class described, comprising a pair of friction rollers between which fabric is adapted to be drawn to rotate the same by frictional contact therewith, a measuring disk co-acting with one of said rollers and adapted to be operated by and in synchronism therewith, a lever carrying one of said rollers for bringing it into contact with and separating it from the other roller, a shear for slitting the fabric at its correct measured length, said shear being operated to slit the fabric by the movement of the lever which raises its roller out of contact with the fabric, means for holding the lever in a position to maintain the rollers separated, means for releasing the lever, and automatic means for moving the lever to open the shear and simultaneously move the roller of the lever into contact with the other roller.

In testimony whereof, I have signed my name to this specification, in presence of two subscribing witnesses.

CARL SCHWARTZ.

Witnesses:
ALFRED A. EICKS,
WALTER C. STEIN.